United States Patent [19]

Criscimagna et al.

[11] 3,976,992
[45] Aug. 24, 1976

[54] GAS DISPLAY PANEL WITH LIGHT PEN

[75] Inventors: Tony N. Criscimagna, Woodstock; Michael J. Steinmetz, Hurley, both of N.Y.

[73] Assignee: IBM Corporation, Armonk, N.Y.

[22] Filed: Jan. 3, 1975

[21] Appl. No.: 538,423

[52] U.S. Cl................. 340/324 M; 315/169 TV; 340/343
[51] Int. Cl.²........................................ G06F 3/14
[58] Field of Search................ 340/324 M, 343; 315/169 TV

[56] References Cited
UNITED STATES PATENTS 3,851,327  11/1974  Ngo ........................... 340/324 M
3,875,472   4/1975  Schermerhorn .............. 340/324 M

*Primary Examiner*—Marshall M. Curtis
*Attorney, Agent, or Firm*—W. S. Robertson

[57] ABSTRACT

An improved light pen is provided for a gas display panel of the type in which an alternating polarity sustain voltage produces a succession of brief light flashes in a matrix of light emitting cells. The timing for the sustain voltage is disturbed along a selected coordinate of the matrix. The coordinate of a light pen is identified when light with this disturbed timing is detected by the pen. Circuits for disturbing the sustain voltage of an individual cell of the matrix are also disclosed.

7 Claims, 4 Drawing Figures

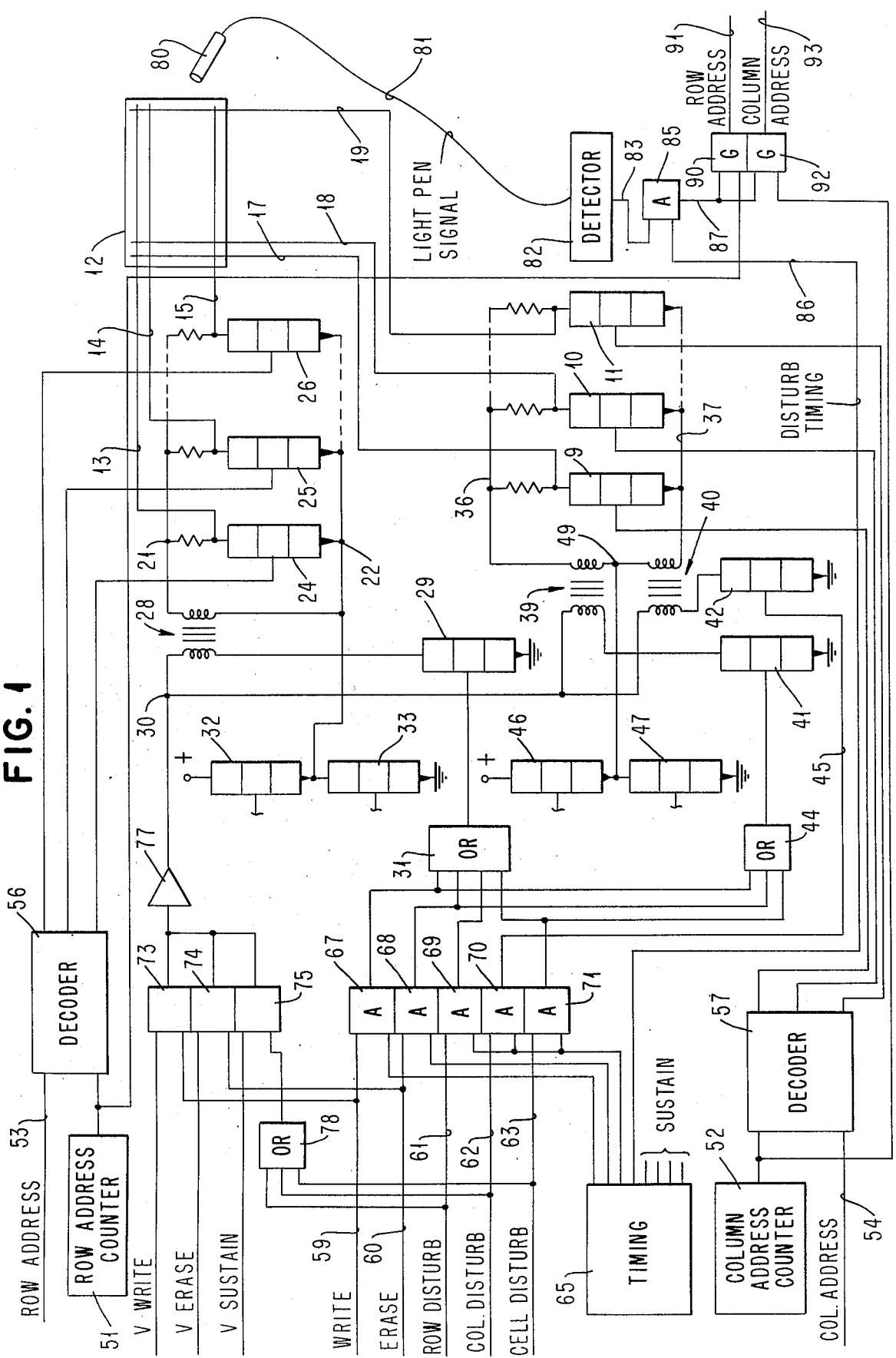

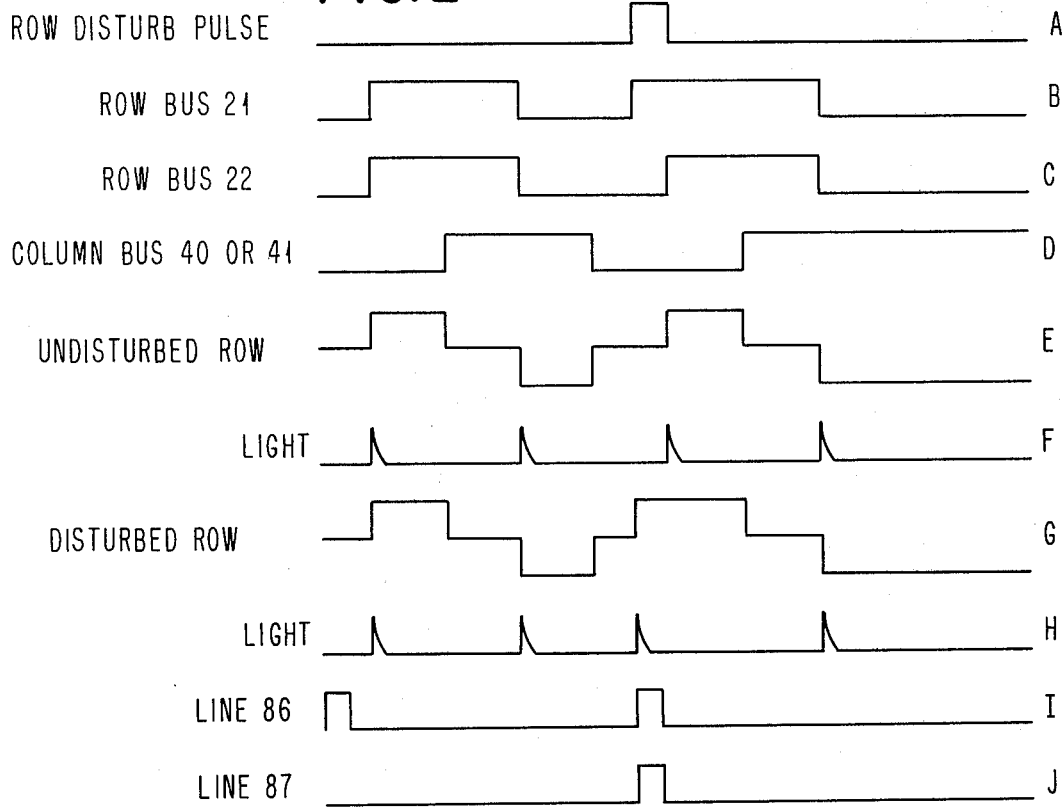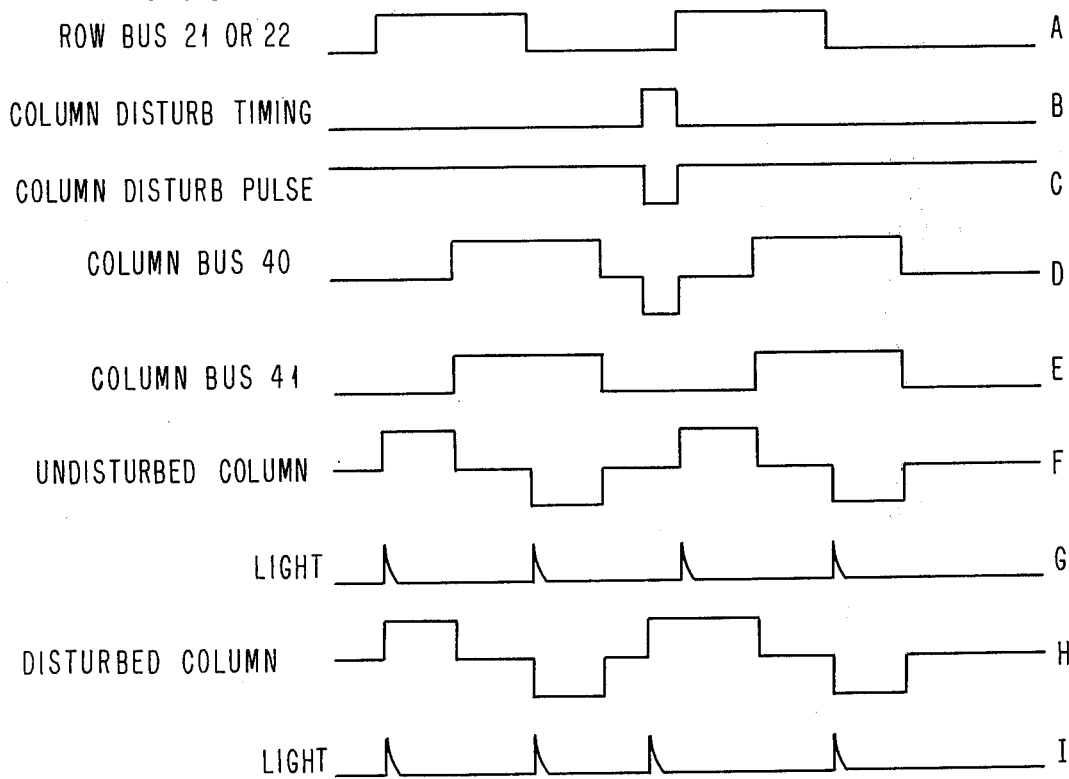

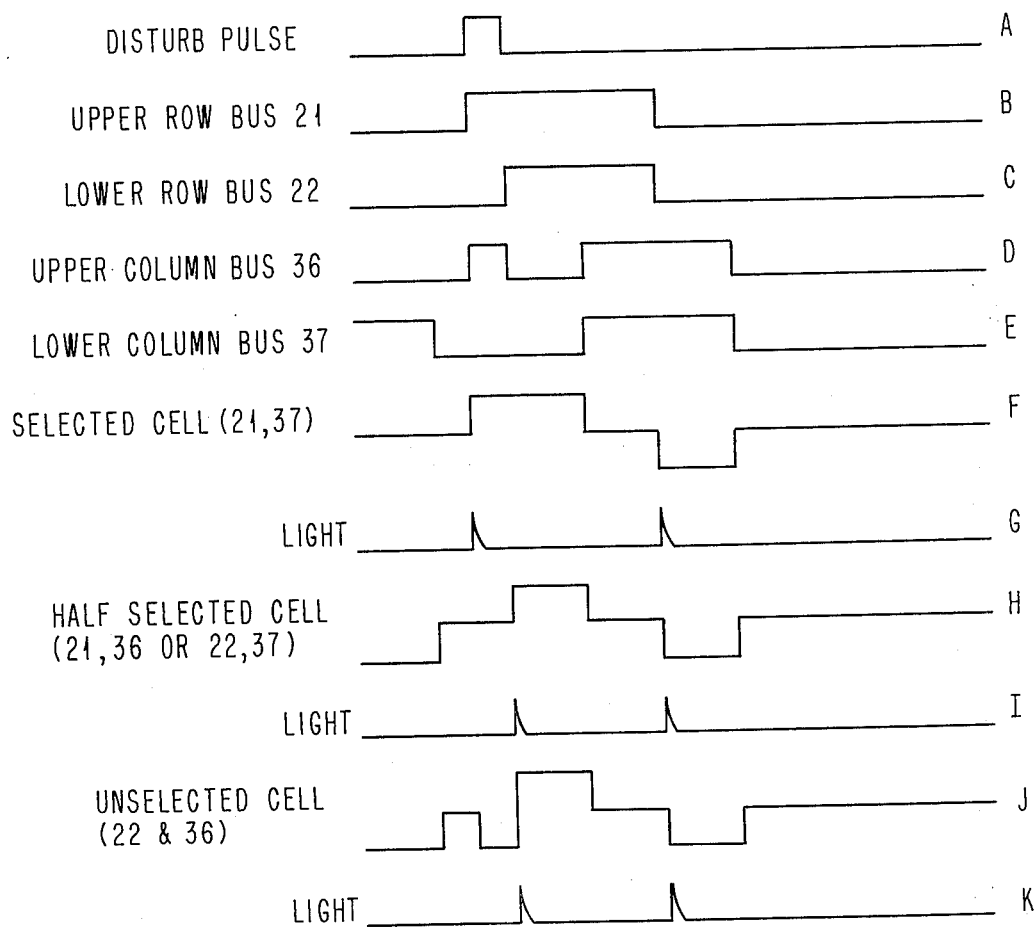

GAS DISPLAY PANEL WITH LIGHT PEN

INTRODUCTION

Gas display panels are well known, but it will be helpful to review the features and terminology that particularly apply to this invention. A gas panel has a matrix of row wires and column wires that are spaced apart to form light emitting cells at their crossover points. When a row wire and a column wire are energized with a voltage that is suitable for a write operation, ionization takes place in the cell and charge is stored on the insulating walls of the cell. An alternating polarity sustain voltage is applied to all of the cells and a sustain voltage in combination with the voltage of the stored charge of a previously written cell is sufficient to produce ionization and an associated light flash and to leave the cell with a wall charge. In the specific gas panel that will be described later, there is a set of transistor switches for the row wires and a set of transistor switches for the column wires. The switches are controlled by addressing counters and connect the individual row wires and column wires to selectively receive voltages for write and erase operations. The counters conventionally provide a scanning sequence to the matrix for writing or erasing.

This invention uses these conventional addressing circuits and modifies the conventional write circuits to provide a light pen operation. Light pen operations are well known in cathode ray tube displays. A light pen is manually held to the display and receives a light signal. Associated components of the display operate on the light signal to identify the address of the pen. There are many application programs that use a signal telling that a light pen has been held to the display or that it has been held to a particular location on the display. A light pen system for a gas panel is disclosed in U.S. Pat. No. 3,851,327.

SUMMARY OF THE INVENTION

In the gas panel of this invention, the sustain pulse is disturbed along a selected row or column of the display to cause any previously written cells to produce a light flash at a time that is distinguishably different from the normal sustain timing. The detection of the light flash that is caused by the disturbed sustain pulse signifies that the addressing circuits of the display hold the row or column address of the pen. The row wires and column wires may be scanned with the disturbed sustain pulse to identify the individual cell at the location of the pen. Circuits for producing a disturbed sustain voltage at an individual cell are also disclosed.

The invention provides means for controlling the conventional write and erase circuits to produce a sustain level pulse on a selected row or column. This pulse precedes and may merge with a subsequent sustain pulse that is produced by the conventional sustain circuit components. Other features and advantages of this circuit will be understood from the description of the specific system that is shown in the drawing.

THE DRAWING

FIG. 1 is a schematic of the gas display panel of this invention.

FIG. 2 is a series of waveforms that illustrate a row disturb operation in the gas display panel of FIG. 1.

FIG. 3 is a series of waveforms that illustrate a column disturb operation in the gas display panel of FIG. 1.

FIG. 4 is a series of waveforms that illustrate a cell disturb operation in the gas display panel of FIG. 1.

THE GAS DISPLAY PANEL OF THE DRAWING

Introduction

FIG. 1 shows a gas panel 12 having a matrix of row and column wires represented by row wires 13, 14 and 15 and column wires 17, 18 and 19. The column wires are selectively connected to an upper bus 21 or to lower bus 22 by representative transistors switches 24, 25 and 26. A transformer 28 is connected with a transistor 29 and a potential point 30 to produce a voltage difference between upper bus 21 and lower bus 22 for conventional write and erase operations and for the light pen operations of this invention. An OR gate 31 supplies transistor 29 with timing signals that will be described later. Transistors 32 and 33 switch lower bus 22 between ground potential and a positive sustain level voltage for a sustain operation. The sustain waveform appears on both buses 21 and 22; voltages supplied by transformer 28 are superimposed on the sustain voltage on upper bus 21.

Similarly, transistors 9, 10, and 11 switch the column wires between an upper bus 36 and a lower bus 37 for conventional write and erase operations and for light pen operations. Two transformers 39 and 40 and associated transistors 41 and 42 are connected with potential point 30 to produce a selected voltage difference between buses 36 and 37. Timing signals are applied to the base terminal of transistor 41 through an OR gate 44 and transistor 42 receives a timing signal on a line 45, as will be described later. Two transistors 46 and 47 are connected to supply a sustain voltage waveform to the common connection point 49 of the secondary windings of transformers 39 and 40. The sustain waveform appears on both buses 36 and 37; the voltage of transformer 39 is superimposed on the sustain waveform on upper bus 36, and the voltage of transformer 40 is superimposed on the sustain waveform of the lower bus 37.

For a conventional write or erase operation, an address is supplied to the row switches and to the column switches. This address is preferably in the form of a number code that is supplied by a row counter 51 and a column counter 52 or by alternative sources 53 and 54. A decoder 56 receives the row count and turns on the unselected transistors and leaves off the transistors selected by the count. A column decoder 57 receives the column count and turns on the selected transistor and leaves off the unselected transistors. (The drawing does not show the conventional latches that store the state of a row or column switch and it does not show circuits that isolate the high voltage of the decoders from the low voltage of the counters.) This arrangement permits transmitting data from the low voltage components to the high voltage components over a minimum number of lines and it adapts readily to a sequential row and column scan of the cells of the panel.

An associated controller (not shown) supplies the addresses on lines 53 and 54 or signals to control counters 51 and 52, and it supplies a signal Write on a line 59 and a signal Erase on a line 60 to control the display to perform these operations. The controller similarly supplies signals Row Disturb, Column Disturb, and Cell Disturb on lines 61, 62 and 63 for the light pen operations. The adaptation of a conventional controller to provide these pen controlling signals will be readily understood when the pen operations have been described. Application Ser. No. 537,238 of Criscimagna and Piston filed Dec. 30, 1974 for "Alphanumeric Gas Display Panel With Modular Control" describes a controller for a gas panel in more detail.

A timing circuit 65 provides timing signals to control the panel operations that occur at various points within the sustain cycle, including the light pen operations. A variety of timing circuits are well known, and timing circuit 65 may comprise an oscillator, a counter that is incremented by the oscillator, and a decoder that produces outputs at particular times that correspond to a count value held in the counter. FIG. 1 shows the connection of timing circuit 65 to supply timing signals for the sustain operation. The timing for these and other operations are shown in FIGS. 2, 3 and 4.

An AND gate 67 responds to the signal Write on line 59 to transmit a timing signal to OR gates 31 and 44 to turn on transistors 29 and 41 for a write operation. Similarly, an AND gate 68 cooperates with gates 31 and 44 to transmit a timing signal to these transistors for a conventional erase operation in response to a signal Erase on line 60. AND gates 69, 70 and 71 similarly respond to the signals on lines 61, 62 and 63 to transmit timing signals to other components of the display as will be described in detail later.

A set of analog gates 73 - 75 and an amplifier 77 control the transformer supply voltage at point 30. An analog gate receives a selected voltage reference at its upper most input and it transmits this voltage to its output when the gate is enabled by a control signal that is applied to its lower most input. An analog gate may comprise a first transistor connected as an emitter follower between the upper most input and the output and second transistor connected to control conduction in the emitter circuit of the first transistor in response to the control signal. Analog gates 73 and 74 are controlled to supply voltages for write and erase operations. Gate 75 is controlled by a gate 78 that produces the OR logic function of the signals on lines 61, 62 and 63. During a light pen operation, analog gate 75 controls transformers 28 and 39 or 40 to produce sustain level voltages between buses 21 and 22 or buses 36 and 37.

The Light Pen

As will be explained later, the gas panel of FIG. 1 is operated to give a selected cell or a selected row or column of cells a sustain pulse that is displaced in time from the normal sustain pulse. The light output of a cell that receives the disturbed sustain pulse is similarly shifted in time from the light pulse that is produced by the cells that receive a normal sustain pulse. A light pen 80 and other components that will be described next respond to this disturbed light output to signal the position of the pen on the display.

Light pen 80 is manually held to the display panel to receive light from a previously written cell and it produces a corresponding electrical signal on a line 81. A detector 82 receives this signal and amplifies it to a logic level amplitude at its output 83. A 1 logic level signal appears at output 83 in response to either a normal sustain pulse or a disturbed sustain pulse. An AND gate 85 receives the signal at output 83 and a timing signal on a line 86 and produces an output on a line 87 on the coincidence of these signals. The signal on line 86 is timed to appear during the period of light output of a cell that receives the disturbed sustain pulse. Thus, the output of gate 85 signifies that a disturbed sustain pulse has been applied to the cell where the light pen is held. In response to a signal on line 87, a set of AND gates 90 transmit the row address from counter 51 to an output 91 and a set of AND gates 92 transmit the column address from counter 52 to an output 93. As will be explained next, the system of FIG. 1 can be operated to supply the row address and the column address in two separate operations, called row disturb and column disturb, or in a combined operation that is called cell disturb.

The Row Disturb Operation— FIG. 2

FIG. 2 shows a full sustain cycle in which no other operation occurs and a subsequent half cycle during which a row disturb operation is performed. In the simple sustain operation, the waveform of line C appears on both the upper and lower row buses 21, 22 and the waveform of line D appears on both the upper and lower column buses 36, 37. These waveforms produce the cell voltage that is shown in line E and each previously written cell produces the light output of line F on the leading edge of the positive and negative sustain voltages of Line E.

Timing circuit 65 produces a timing signal at the input to AND gate 69 that is shown in line A of FIG. 2. When the signal Row Disturb is applied to line 61, AND gate 69 and OR gate 31 cooperate to transmit this signal to transistor 29. OR gate 78, analog gate 75 and amplifier 77 cooperate in response to the signal Row Disturb to produce an appropriate voltage at point 30 so that the pulse of FIG. 2 line A appears across the secondary winding of transformer 28 with a sustain level amplitude when transistor 29 is turned on. During the occurrence of the row disturb pulse, the sustain timing turns on transistor 33 and turns off transistor 32 so that lower row bus 22 has ground potential. The unselected transistors are turned on so that the associated row wires of the display receive the ground voltage at the lower bus 22. A selected transistor is not turned on and its associated wire receives the sustain voltage level at upper bus 21. As lines A, B, D and G show, each cell in the selected row receives a sustain level voltage that occurs ahead of the normal sustain timing. The light output associated with the disturb pulse is correspondingly advanced in time about 1.0 microsecond, and may be detected by the light pen, as lines H, I, and J of FIG. 2 show.

The Column Disturb Operation — FIG. 3

As can be seen from line H of FIG. 3, the column disturb produces the same shift in the light output of a disturbed cell as the row disturb operation. In response to the signal Column Disturb on line 62, AND gate 70 transmits the disturb timing pulse to line 45 to turn on transistor 42 and analog gate 75 and associated components give point 30 an appropriate potential to produce a sustain level voltage across the secondary winding of transformer 40. During this operation transistor 47 is turned on and point 49 is at ground potential. The polarity of the windings of transformer 40 causes the sustain voltage pulse on lower column bus 37 to be negative with respect to ground, as lines C and D in FIG. 3 show. The negative pulse on a selected column wire cooperates with the ground potential on all of the column wires to give the cells of a selected column a positive sustain voltage as shown in line H.

For some applications for the light pen system of this invention it may be sufficient to identify either the row or the column of the pen position. The column or row counter can be advanced in a scanning sequence until the light pen signal on line 87 or the address signal on lines 91 or 93 identifies that the pen position has been reached. For other applications, it is desirable to identify an individual cell by its row and column coordinate position, and the row disturb operation and the column disturb operation can be performed in succession to locate the pen position.

The Cell Disturb Operation — FIG. 4

An individual cell of the display is addressed with a disturbed sustain voltage in the same general way that an individual cell is addressed with a write or erase voltage. There are several known techniques for this addressing. In the gas panel of the drawing, a write operation is performed by turning on the unselected row transistors so that their associated wires receive the sustain voltage on bus 22 and leaving off a selected transistor so that its wire receives the sustain voltage and the write voltage in superposition on bus 21. A selected column transistor is turned on to maintain its wire at ground potential and the unselected transistors are left off to give their column wires the write level voltage on bus 36. The voltage on the column conductors inhibits the write operation that would otherwise take place in the unselected cells of the selected row.

As lines A, F, and G in FIG. 4 show, the cell disturb operation produces the same disturb timing as the row and column disturb operations that have been described already. The signal cell disturb on line 63 enables analog gate 75 to produce a sustain voltage at point 30 and it enables gate 71 to turn on transistor 29 and 41 and thereby establish sustain level voltages between bus 21 and 22 and between bus 36 and bus 37. The transistor switches are operated to give the row wire of the selected cell the waveform of line B and to give the column wire of the selected cell the waveform of line E. A half-selected cell undergoes a normal sustain operation as lines H and I in FIG. 4 show. An unselected cell receives a negative pulse as shown in lines J and K. This negative pulse does not produce a light output, as can be assured if necessary by selecting the amplitude or timing of the pulse on bus 36.

OTHER EMBODIMENTS

The preferred embodiment of the invention is particularly adapted to use the sustain and write circuits and operations of a known gas panel with a minimum of modifications and additional components. The preferred gas panel can be modified to produce other disturbances in the sustain waveform. The invention is applicable to a variety of gas panel designs and suitable modifications will be apparent to those skilled in the art within the spirit of the invention and the scope of the claims.

What is claimed is:

1. A gas panel of the type having row and column coordinate wires forming a matrix of light emitting cells, means for applying a sustain voltage to said row wires and a different sustain voltage to said column wires to produce an alternating polarity sustain voltage across each cell to produce a succession of brief light flashes from any previously written cell, and means for addressing particular row and column wires for write and erase operations, the improvement comprising,
   means for disturbing the timing of the leading edge of a sustain voltage of the cells of an addressed coordinate wire, whereby each previously written cell of the addressed coordinate produces a light flash at a time different from the light flash of other previously written cells, and
   means including a light pen positionable at a cell of the array for detecting a light flash at the time of the leading edge of the disturbed sustain voltage and for signalling the address of the addressed coordinate.

2. The gas panel of claim 1 wherein said timing disturbing means comprises means selectively superimposing a sustain level pulse on the means for applying a sustain voltage to the row and column wires.

3. the gas panel of claim 2 wherein said timing disturbing means comprises means for producing said sustain level pulse ahead of the normal sustain voltage.

4. The gas panel of claim 3 wherein said gas panel includes means for producing a write voltage for said column and row wires and wherein said timing disturbing means comprises,
   means for operating said write means at a time selected for a disturb operation and,
   means to supply a voltage to said write means to produce said sustain level pulse.

5. The gas panel of claim 4 wherein said write means and said sustain voltage means comprise, separately for the row wires and for the column wires, an upper bus, a lower bus, means for applying said sustain voltage in a predetermined polarity to said upper and lower buses, means for selectively superimposing write and erase voltages on said upper bus, and switch means for selectively connecting each wire of a coordinate to an upper or a lower bus, whereby a cell receives a voltage difference according to the connection of its row and column wires to said upper and lower buses, and means timing the sustain voltage for the column wires to lag the sustain voltage for the row wires, whereby the leading edge of the sustain voltage for the row wires establishes the leading edge of the difference voltage at a cell,
   further comprising means providing a signal designating a row disturb operation, and
   wherein said means for producing said sustain level pulse comprises means responsive to said row disturb signal for controlling said write means for said row wires to produce a sustain level pulse of said predetermined polarity on said upper bus for said row wires.

6. The gas panel of claim 5 including,
   means providing a signal designating a column disturb operation, and
   means responsive to said column disturb signal for controlling said write means for said column wires to produce a sustain level pulse of the opposite polarity on the upper bus for said column wires.

7. The gas panel of claim 5 including,
   means providing a signal designating a cell disturb operation, and,
   means responsive to said cell disturb signal for controlling said write means to produce a sustain level pulse of said polarity on the upper bus for said row wires and controlling said write means for said column wires to produce a voltage on the upper bus for said column wires for inhibiting a disturbed sustain operation in the unselected cells of the selected row.

* * * * *